008
United States Patent Office 3,290,773
Patented Dec. 13, 1966

3,290,773
PROCESS FOR WELDING NICKEL TO NIOBIUM
Cornel Wohlberg and Jack R. Markham, Los Alamos, N. Mex., assignors to the United States of America as represented by the United States Atomic Energy Commission
No Drawing. Filed Nov. 13, 1963, Ser. No. 323,514
3 Claims. (Cl. 29—498)

This invention is concerned with a process for the welding of nickel to niobium, and particularly with a welding process that uses Monel as a filler to join the nickel to the niobium metal member.

The welding of a nickel metal member to a niobium metal piece has been done previously, but the various welds suffered from two deficiencies: (1) the weld was brittle, and (2) for plasma thermocouple applications a vacuum tight type weld was necessary. This invention solves these two problems by the use of Monel as a filler so as to produce a welded joint that will not become brittle under extreme thermocycling conditions and is vacuum tight.

As concerns this invention, the inventors define the term "Monel" as any wrought nickel-copper rod composition that contains 65–69 weight percent nickel, 29–32 weight percent copper, and the remainder percentages being carbon, manganese, sulfur, silicon and iron.

It is therefore an object of this invention to provide a process to weld nickel to niobium.

It is a further object of this invention to provide a process to weld nickel to niobium which uses wrought Monel as a filler.

A still further object of this invention is to provide a process for welding nickel to niobium which results in a vacuum tight, non-brittle weld.

A description of the preferred embodiment of this invention is as follows:

Two ½-inch metal tubes of nickel and niobium metal respectively are welded using a Heliarc as the heat source and a 1/16-inch wrought Monel rod as the filler. The said Monel filler rod has a composition of 67 weight percent nickel, 30 weight percent copper, and the remaining 3 percent is a mixture of carbon, manganese, sulfur, silicon, and iron.

The inventors define the term "Heliarc" as an arc welding process in which the molten pool of weld metal is completely shielded from the normal atmosphere by a continuous flow of inert gas such as argon or helium and employs a non-consumable tungsten electrode.

Using the aforementioned process, a weld was thermally cycled 25 times between 20° C. and 1025° C. without the weld becoming brittle.

The only limitations as concerns the Monel filler rod is that it must be wrought, not cast, and the aforementioned nickel-copper composition must be strictly adhered to. Monel with nickel-copper compositions outside the above stated composition do not produce a non-brittle, vacuum tight weld.

Although the invention has been described and illustrated in detail, it is clearly understood that the same is by way of illustration and example only and is not to be taken by way of limitation, the spirit and scope of this invention being limited only by the terms of the appended claims.

What is claimed is:

1. A process for Heliarc welding nickel to niobium in which there is employed a welding filler rod consisting essentially of wrought Monel as defined herein.

2. The process of claim 1 in which the said welding filler rod includes between substantially 65 and 69 weight percent nickel, and 29 and 32 weight percent copper.

3. The process of claim 2 in which the welding filler rod consists of 67 weight percent nickel and 30 weight percent copper, the balance being minor amounts of sulfur, manganese, carbon, silicon, and iron.

References Cited by the Examiner
UNITED STATES PATENTS

| | | | |
|---|---|---|---|
| 2,626,339 | 1/1953 | Wasserman | 219—146 |
| 3,107,176 | 10/1963 | Witherell | 219—146 |

JOHN F. CAMPBELL, *Primary Examiner.*